United States Patent
Toy et al.

(10) Patent No.: US 7,409,867 B2
(45) Date of Patent: Aug. 12, 2008

(54) PRESSURE SENSOR USING LIGHT SOURCE

(75) Inventors: Andrian C. Toy, Eden Prairie, MN (US); Liang-Ju Lu, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/439,097

(22) Filed: May 23, 2006

(65) Prior Publication Data
US 2007/0272026 A1 Nov. 29, 2007

(51) Int. Cl.
*G01L 9/12* (2006.01)
(52) U.S. Cl. .......................... 73/724; 73/715
(58) Field of Classification Search ........... 73/700–756; 361/283.1–283.4
See application file for complete search history.

(56) References Cited

U.S. PATENT DOCUMENTS

| | | | | |
|---|---|---|---|---|
| 4,933,545 A * | 6/1990 | Saaski et al. | ........... | 250/227.14 |
| 5,128,537 A * | 7/1992 | Halg | ........... | 250/231.19 |
| 5,404,218 A * | 4/1995 | Nave et al. | ........... | 356/301 |
| 5,619,046 A * | 4/1997 | Engström et al. | ........... | 257/82 |
| 6,040,191 A * | 3/2000 | Grow | ........... | 506/12 |
| 6,484,585 B1 | 11/2002 | Sittler et al. | ........... | 73/718 |
| 6,820,487 B2 * | 11/2004 | Esashi et al. | ........... | 73/705 |
| 6,901,101 B2 | 5/2005 | Frick | ........... | 372/92 |
| 6,941,813 B2 * | 9/2005 | Boukhny et al. | ........... | 73/705 |
| 6,967,571 B2 * | 11/2005 | Tsujita | ........... | 340/447 |
| 7,019,630 B2 * | 3/2006 | Katou | ........... | 340/448 |
| 7,060,965 B2 * | 6/2006 | Vidovic et al. | ........... | 250/227.14 |
| 2004/0233458 A1 | 11/2004 | Frick | ........... | 356/480 |
| 2005/0063444 A1 | 3/2005 | Frick | ........... | 372/92 |

FOREIGN PATENT DOCUMENTS

| | | |
|---|---|---|
| EP | 0 423 903 A2 | 6/1985 |
| EP | 1 026 493 A2 | 8/2000 |
| EP | 1 244 899 B1 | 12/2000 |
| WO | WO 01/59419 | 8/2001 |
| WO | WO 02/23148 | 3/2002 |
| WO | WO 2005/033643 | 4/2005 |
| WO | WO 2006/092052 | 9/2006 |
| WO | WO 2007/019676 | 2/2007 |

OTHER PUBLICATIONS

"Notification of Transmittal of the International Search Report and the Written Opinion" for PCT/US2007/012050.
Journal of Lightwave Technology, vol. 19, No. 10, Oct. 2001, "Self-Calibrated Interferometric-Intensity-Based Optical Fiber Sensors", Wang et al., pp. 1495-1501.
"The World's Smallest High-Temperature Pressure Sensor is Developed by Researchers at Virginia Tech's Center for Photonics Technology", http://www.ee.vt.edu/~photonics/newsStorysmallestsensor.html, one page.

* cited by examiner

*Primary Examiner*—Andre J. Allen
*Assistant Examiner*—Jermaine Jenkins
(74) *Attorney, Agent, or Firm*—Westman, Champlin & Kelly, P.A.

(57) ABSTRACT

A pressure sensor includes a structure that deforms in response to an applied pressure. A light source is directed at the structure. This provides a reflection from the structure. A sensor is arranged to sense the reflection and provide an output related to the applied pressure.

10 Claims, 5 Drawing Sheets

PRESSURE SENSOR USING LIGHT SOURCE

BACKGROUND OF THE INVENTION

The present invention relates to the process control industry. In particular, the invention relates to a pressure sensor in a pressure transmitter.

Pressure transmitters in process applications measure pressure of a process and responsively communicate the information over a two-wire process application loop, for example a 4-20 mA current loop. Pressure sensors in transmitters typically comprise some type of a pressure responsive structure which has a deflectable diaphragm that moves in response to applied pressure. These structures can be used to measure both absolute and differential pressure. As used herein, a differential pressure sensor is a sensor which measures a relatively small pressure differential (such as that generated across an orifice in a flow tube or between two different heights in a fluid filled container) over a relatively wide absolute pressure range. In a typical prior art transmitter, to measure differential pressure, two different pressures are applied to opposing sides of the structure causing a relative deformation in the structure which is measured. Measurement of the deformation, for example, can be achieved by measuring a change in electrical capacitance due to movement of capacitor plates carried on the structure, by change in resistance of a resistive strain gauge, etc.

Highly accurate absolute pressure sensors have been desired. It also may be preferable desirable to measure differential pressure with two separate absolute pressure sensors, employing two separate absolute pressure sensors is mechanically much simpler than mechanically coupling two pressures to a differential pressure sensor. Additionally, an over-pressure condition in such a differential pressure sensor can damage the differential pressure sensor. However, it has been difficult to obtain absolute pressure sensors with sufficient accuracy to allow differential pressures in the 0.4 psi to 40 psi range to be measured in a device which must withstand static or line pressure extremes of as much as 4000 psia. For example, 0.01% of 4 psid requires 0.00001% of 4000 psia ($10^{-7}$ or 0.1 ppm).

Typical known pressure sensors used in process applications have unit-to-unit variations in sensitivity to sensed pressure as well as unit-to-unit variations in undesired responses to extraneous parameters such as temperature. This can be a particular problem when the outputs of two absolute or gauge pressure sensors are combined to provide an output representing differential pressure or when the sensor is used over a large pressure range. Additionally, mechanical stress associated with mounting the sensor to the pressure transmitter may result in relatively large errors in pressure measurement.

Another type of pressure sensor is described in U.S. Pat. No. 6,484,585 entitled PRESSURE SENSOR FOR A PRESSURE TRANSMITTER assigned to Rosemount Inc. by Sittler et al. which issued Nov. 26, 2002. The Sittler et al. patent describes a different type of pressure sensor which is made of a brittle material. Capacitive plates are carried in the material and spacing between the capacitive plates changes in response to an applied pressure. This causes the electrical capacitance between the plates to change which can be measured and correlated to the applied pressure.

SUMMARY

A pressure sensor includes a structure that deforms in response to an applied pressure. A light source is directed at the structure. This provides a reflection from the structure. A sensor is arranged to sense the reflection and provide an output related to the applied pressure.

DETAILED DESCRIPTION

In the present invention, a pressure sensor is provided which has a structure which deforms in response to an applied pressure. Light is directed at the structure and its reflection is observed and correlated to the applied pressure. In some prior art configurations, a single frequency light source is used and the resultant reflection used to determine deflection of a diaphragm. However, in such a configuration, the reflected frequency periodically repeats for various deflections of the diaphragm. Thus, without utilizing some other technique, it is impossible to determine which of the periodic repetitions in the frequency is being observed and therefore impossible to determine the deflection of the diaphragm. In contrast, in one configuration the present invention uses multiple frequencies to determine the deflection of a diaphragm configuration formed by a pair of substrates.

Figure 1:
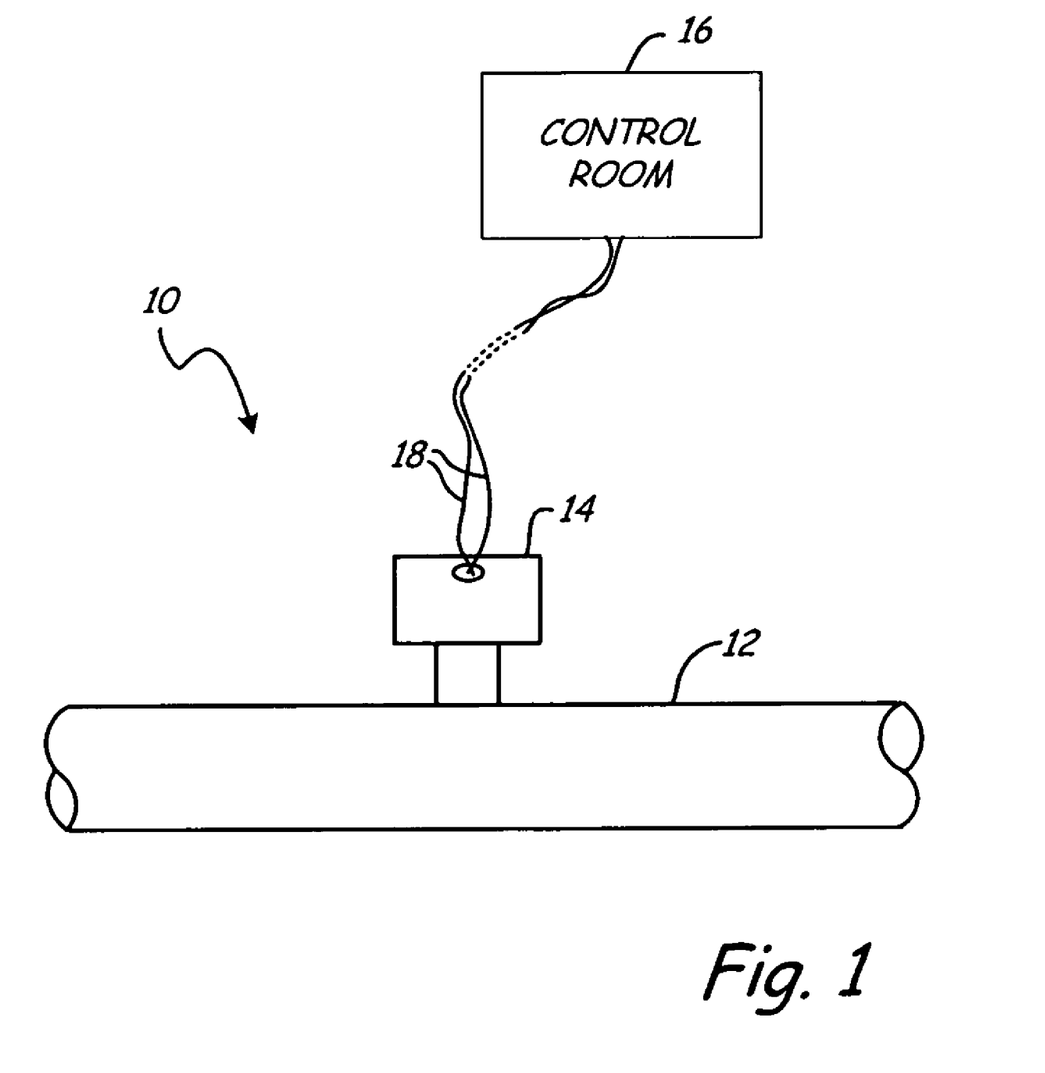
FIG. 1 is a simplified diagram of a process control or monitoring system.

FIG. 1 illustrates an industrial process control or monitoring system 10 of a type in which the pressure sensor of the invention maybe applicable which includes process piping 12. In this example, a pressure transmitter 14 is shown coupled to piping 12 and provides a signal to control room 16 over a two wire process control loop 18. The output from transmitter 14 is related to pressure of process fluid carried in process pipe 12. In some configurations, the two wire process control loop 18 is used for both signaling and providing power to transmitter 14. Loop 18 can operate in accordance with any appropriate technique such as known standards including a 4-20 mA standard, the HART® communication protocol, FieldBus communications protocols, etc. Additionally, the control loop may operate wirelessly, etc.

Figure 2:
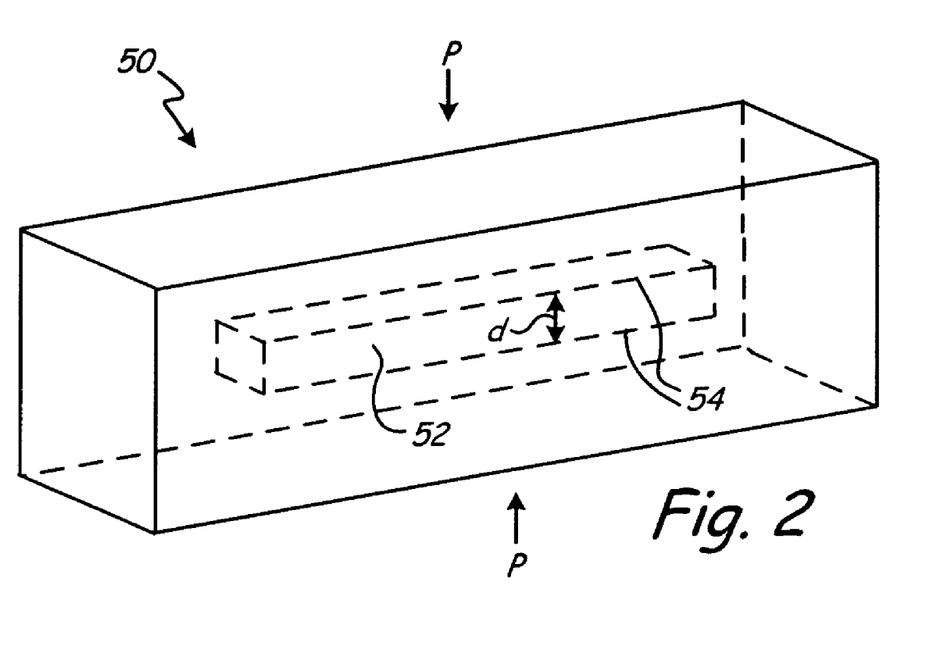
FIG. 2 is a prospective view of a deformable pressure sensitive body.

FIG. 2 is a perspective view of a deformable pressure sensitive body 50 of a generally transparent or translucent material. Deformable pressure sensitive body 50 can be made in accordance with, for example, techniques set forth in U.S. Pat. No. 6,484,585 entitled PRESSURE SENSOR FOR A PRESSURE TRANSMITTER issued Nov. 26, 2002 to Sittler et al. and assigned to Rosemount Inc. which is incorporated herein by reference in its entirety. For example, deformable pressure sensitive body 50 can be formed of sapphire, silicon, ruby, quartz, diamond and may comprise a single crystal material. Body 50 includes a cavity 52 formed therein. As a pressure P is applied to body 50, a spacing d between internal walls 54 of cavity 52 changes.

Body 50 can be formed of, for example, two or more substrates of brittle material which are fusion bonded together by placing the substrates together under pressure and optionally applying heat. Such a configuration reduces the amount of defects in the body 50 and improves the repeatability of the relationship between changes in the spacing d and the applied pressure P.

Figure 3:
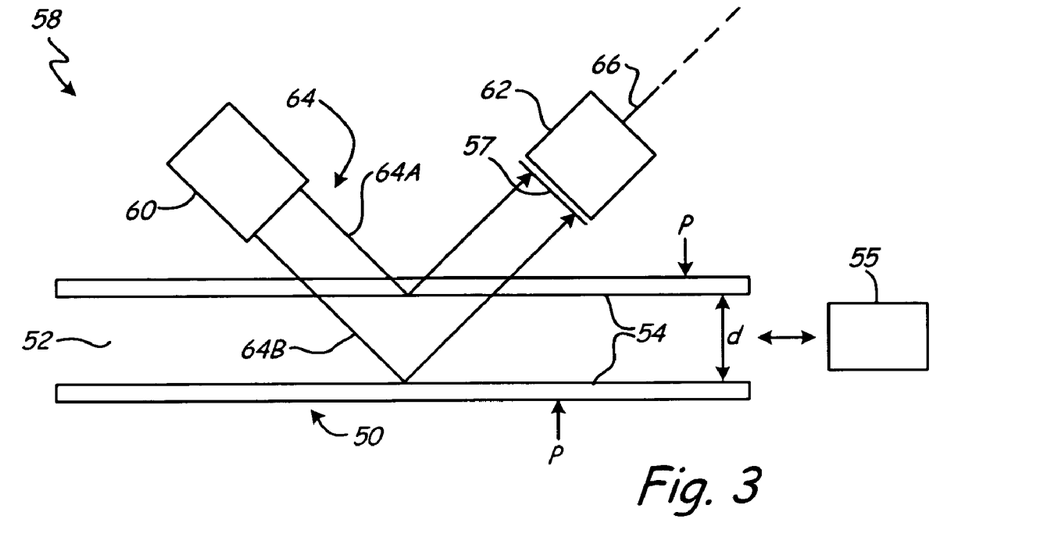
FIG. 3 is a diagram illustrating reflected light through the deformable pressure sensitive body.

FIG. 3 is a cross sectional view of deformable body 50 which illustrates operation of the present invention. In FIG. 3, a pressure sensor 58 is formed using a light source 60 and a spectrometer 62. Element 62 can be any appropriate detector including a CCD detector sensor. Source 60 is configured to direct a light beam 64 toward body 50. A portion 64A of beam 64 is reflected at one interface between wall 54 and cavity 52 while a second portion 64B is reflected at the other interface between cavity 52 and wall 54. Sensor 62 is positioned to receive light beam 64 including reflected portions 64A and 64B. The reflected portions 64A and 64B cause interference there between which is either constructive or destructive of certain wavelengths. The interference is a function of the spacing d between the two walls 54 of cavity 52. As the spacing d varies with the applied pressure P, an output 66 from spectrometer 62 can be correlated to the applied pressure.

In one configuration, cavity 52 contains a fluid such as oil. As the spacing d changes, the thickness of the oil film simultaneously changes. Using reflectance spectroscopy, changes in the color of the reflected light can be sensed by sensor 62 and correlated to the applied pressure P. In such a configuration, a reservoir 55 should be provided which receives the oil contained in cavity 52 as the spacing d decreases. Similarly, as spacing d increases, reservoir 55 supplies oil for filling the increasing volume. The fluid used to fill cavity 52 should absorb some of the light, thus allowing the reflectance spectroscopy to observe changes in the distance d.

In another configuration, the cavity 52 can comprise, for example, a vacuum in the constructive/destructive interference between the reflected light as observed. By using interferometry, the reflected light is monitored using a spectrometer with a defraction grating such as grating 57 shown in FIG. 3. The grating can be a component within the spectrometer 62. If a spectrometer is not used, for example by using a one dimensional CCD detector, then an external grating can be employed. Sensor 62 can comprise a linear CCD. The grating 57 provides a disbursed pattern having changing intensity levels. The changing intensity levels are caused by interference in the reflected light. These patterns repeat for various pressures. In typical prior art techniques which use a detraction grating, the pressure sensor 58 must be recharacterized each time the system is used or if power is lost. However, in one aspect, the present invention includes a memory, such as memory 104 (see FIG. 5) as configured to store the characteristic of the spectrum of the reflected light across a pressure range. Thus, the pressure sensor does not require an initial recalibration when the system is powered out.

The light source 60 can be any appropriate light source including, for example, a laser. The light beam 64 can be of any appropriate format and need not be coherent light. Furthermore, the light does not need to be visible light and can be electromagnetic radiation of any appropriate wavelength. Similarly, the sensor 62 can be any appropriate sensing technology which is preferably sensitive to light beam 64, for example a one-dimensional linear CCD array. An image of the spectrum is projected onto the one-dimensional linear CCD array 62. The data corresponding to the pressure is transferred to a memory 104 through an A/D converter 100 (see FIG. 5). When pressure changes, cavity length d changes, and the spectrum is shifted. Through a comparison performed by controller 103 with data stored in memory 104, the pressure changes can be detected. If memory 104 comprises a non-volatile memory, even if power is lost, the system still retains the pressure data and spectrum data in memory 104.

Figure 4:
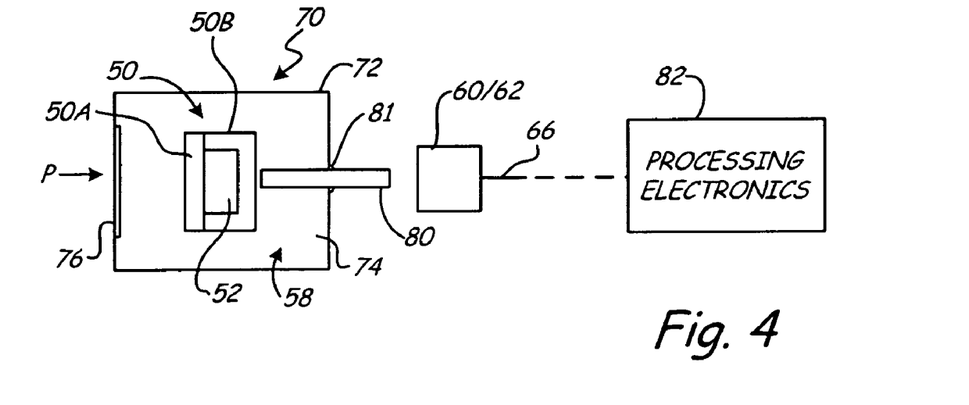
FIG. 4 is a diagram that is a deformable pressure sensitive body.

FIG. 4 is a cross sectional view of one embodiment of a pressure sensor module 70 which includes pressure sensor 58. Pressure sensor module 70 includes a sealed housing 72 which is filled with an isolation fluid 74. The body 50 is suspended in the fluid using, for example, a support, or can be mounted to optical fiber 80. Isolation fluid can be, for example, an oil or the like which is substantially incompressible. An isolation diaphragm 76 extends over an opening in housing 72 such that an applied pressure P applied to isolation diaphragm 76 is transferred across the diaphragm 76 to isolation fluid 74. Isolation fluid 74 thereby applies the pressure P to body 50.

In FIG. 4, body 50 is illustrated as having two portions, a flat portion 50A and an etched portion 50B. The portions 50A and 50B are bonded together, for example, using fusion bonding to form the cavity 52. An optical fiber 80 extends into housing 72 and has a tip directed at body 50. Optical fiber 80 couples the light beam 64 (see FIG. 3) from source/sensor 60/62 to the body 50. In the configuration illustrated in FIG. 4, the source 60 and the sensor 62 are illustrated as a single component.

In the configurations of some pressure sensors, the die of the sensor body must extend outside of the sensor package so electrical connections can be made to the sensing capacitors with the body. This requires that a relatively large seal extend around the die of the sensor body. Further, some sensors have rectangular cross sections which create sharp corners which are difficult to seal. Such seals can be made using a braze. However, the braze can exert large forces onto the sensor die and thereby introduce inaccuracies in the measurement.

Preferably, the optical fiber 80 has a circular cross section and therefore does not have any sharp corners. The fiber can be for example, on the order of 125 µm in diameter thereby requiring only 0.015 inches circumference to seal where the fiber 80 enters housing 72. The seal 81 (see change in FIG. 4) can be formed using any appropriate technique including braising or other techniques. Isolation diaphragm 76 can be of a thin metal layer and can be fabricated using techniques known in the manufacture of pressure transmitters. While two embodiment shows the sensor body 50 isolated from the process fluid, it is appreciated that other embodiments could provide that the sensor directly contacts the process fluid The output 66 is provided to processing electronics 82. Note that if light beam 64 comprises a single frequency, the maximum deflection distance d which can be accurately sensed is limited to one wavelength of that frequency. This is because the interference pattern will repeat for deflections greater than one wavelength and the processing electronics 82 cannot distinguish the repeating pattern. However, if multiple frequencies are used in light beam 64, then a more complex pattern is generated. The more complex pattern can be mapped to deflections of spacing d in body 50 which are greater than one wavelength to thereby allow an extended operating range for the pressure sensor 58. In such a configuration, light source 60 comprises a multifrequency light source. On one example, the light source sweeps through a range of about 250 nm to about 700 nm and the intensity of the reflected light is observed. The intensity pattern can be characterized and can be correlated with the applied pressure. As this frequency sweep may take a number of seconds, in one configuration the sweep is only performed periodically. Once the applied pressure is determined using the reflectance spectroscopy technique, the pressure can be continued to be monitored by using a single frequency. As discussed above, when using a single frequency, is it not possible to know which of any number of deflection positions caused the reflected light. This is because the reflected light repeats periodically. For example, the reflected light may look the same color at multiple spacings between the substrates, for example at spacings of 2500 angstroms, 4000 angstroms, 8500 angstroms and 12000 angstroms. The frequency of the reflected light is the same for each of these spacing. However, by periodically using a multifrequency technique to determine the actual deflection, a single frequency technique can be used to more rapidly update the pressure determination. The multifrequency technique can be repeated periodically, or more frequently if the single frequency measurement technique indicates that the deflection between the diaphragms is changing rapidly.

Figure 5:
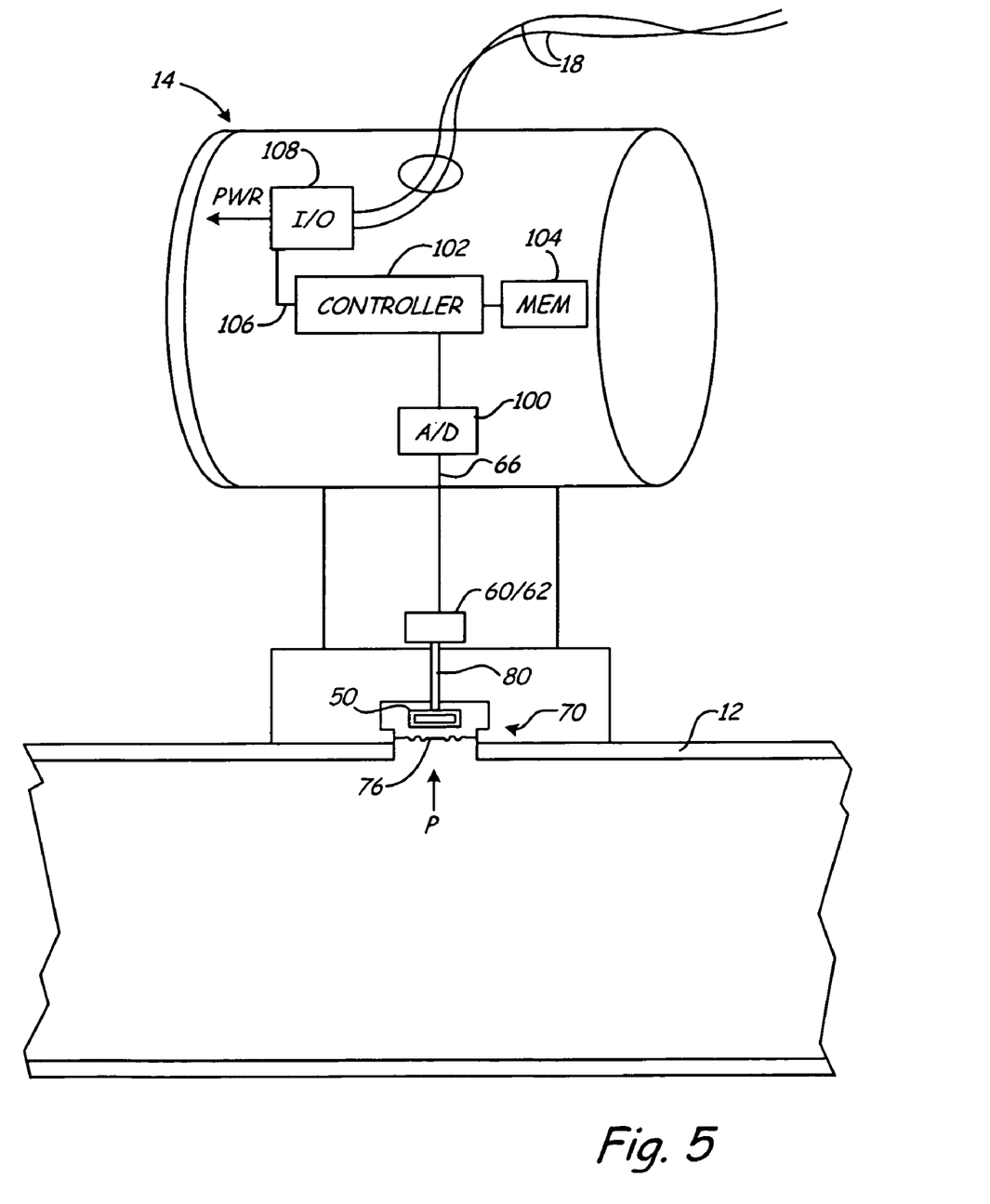
FIG. 5 is a diagram of a pressure transmitter including a deformable pressure sensitive body.

FIG. 5 is a simplified diagram of transmitter 14 coupled to process piping 12 and including a pressure sensor module 70. In the configuration of FIG. 5, on the output 66 from source/sensor 60/62 is provided to an analog to digital converter 100. The output from analog to digital converter 100 is provided to a controller 102 which can comprise, for example, a microprocessor or the like. Controller 102 operates in accordance with programming instructions stored in memory 104 and provides an output 106 to input/output circuitry 108. The output 106 is related to the applied pressure P. I/O circuitry 108 couples to a two wire process control loop 18 and is configured to transmit an output related to the applied pressure P. In some configurations, I/O 108 includes a power output which can be used to power circuitry of transmitter 14.

Preferably, the sensor body is formed of at least a partially transparent material so that the light can enter the material and be reflected.

Figure 6:
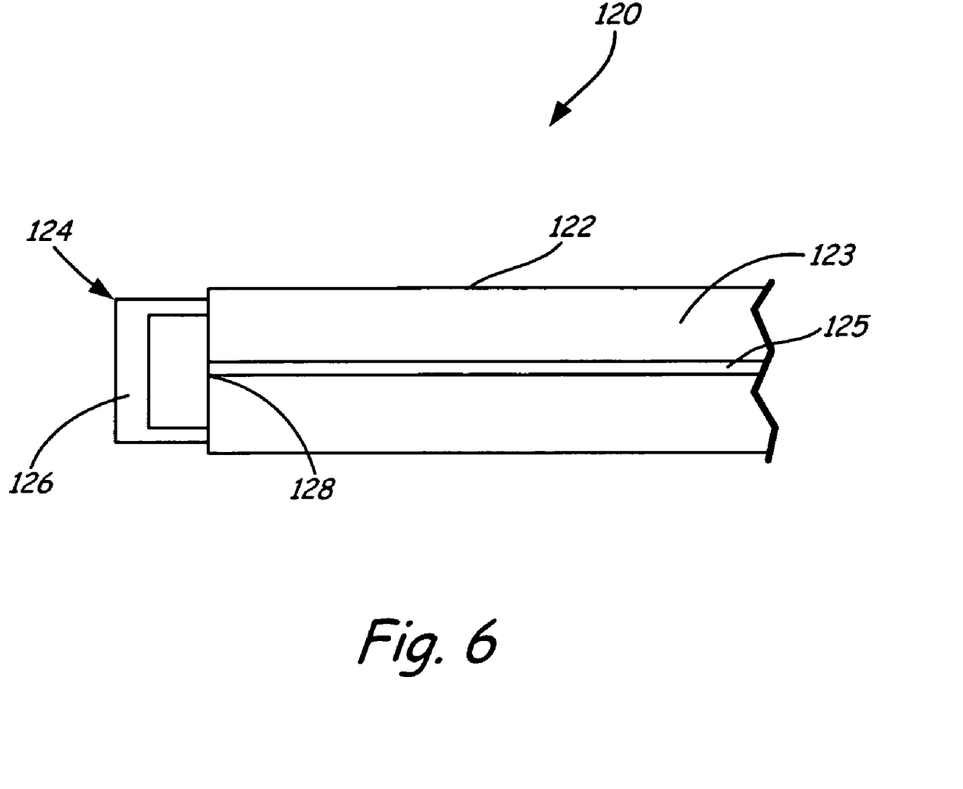
FIG. 6 shows a plan view of another example configuration of a pressure sensor in accordance with the invention.

FIG. 6 shows another example configuration 120 of the present invention in which the pressure sensor is formed by directly coupling an optical fiber 122 to a deformable sensor body 124. The optical fiber 122 comprises a cladding 123 and a core 125. The deformable sensor body comprises, preferably, a transparent brittle material which is bonded to the end of fiber 122. In this configuration, the first and second layers discussed above are formed by layer 126 of sensor body 124 and by the face 128 provided at the end of optical fiber 122. The body 124, in one particular configuration, can comprise an etched sapphire wafer bonded hermetically directly to the tip of fiber 122.

Figure 7:
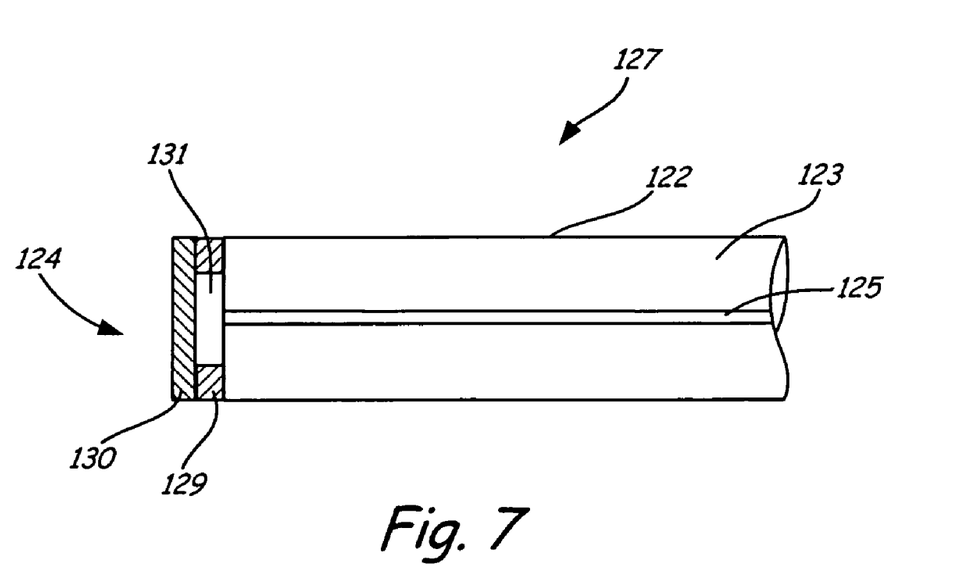
FIG. 7 shows a plan cross sectional view of another example configuration of a pressure sensor in accordance with the invention.

FIG. 7 shows another example configuration 127 of the present invention in which the deformable sensor body 124 is formed using a thin sapphire diaphragm 130 that is fused to a thin sapphire disk 129 having a hole 131 formed in the center. Sapphire disk 129 provides a spacer between the surface of the thin sapphire diaphragm 130 in the end of the optical fiber 122. Note that the diaphragm 130 and disk 129 can be any appropriate configuration and are not limited to the round configuration discussed herein. The disk 129 is fused on the sapphire fiber 122. Any appropriate materials can be used including quartz and the fiber can comprise a standard optical fiber. This configuration allows improved control over the thickness, parallel orientation and surface finish quality of the diaphragm. This also more easily allows the diaphragm and the fiber tip to be more nearly parallel. The hole or gap 131 is also more easily controlled and fabricated. The diaphragm 130 itself can be separately finished as desired.

In one aspect, the invention relates to a known effect which occurs, for example, with soap bubbles or on a thin oil film on water. This effect is used for the determination of the film thickness. For example, many colors are visible on a soap bubble which change according to the layer thickness, e.g. when a soap bubble is blown up. These "colors at thin layers" are based on the interference phenomenon, i.e. on the superposition of light waves, which have been reflected at the front and back side of the layer (at two boundaries with different optical densities).

The undisturbed superposition of the two reflected light rays 1 and 2 leads to periodical amplifications and extinction in the spectrum of a white continuum light source (such as a halogen spectral lamp as a pseudo white-light source).

Since the superposition of the two light rays is not purely additive, a so-called interference occurs. The sensor is illuminated through, for example, a fiber optics cable with a coupler, which is connected to the spectrometer and a halogen lamp. The reflected interference spectrum is guided back to the spectrometer, where at it is analyzed and the cavity length d change is computed.

Although the present invention has been described with reference to preferred embodiments, workers skilled in the art will recognize that changes may be made in form and detail without departing from the spirit and scope of the invention. As discussed above, the multifrequency technique of the present invention can be implemented as a supplement to a single frequency technique. In such a configuration, a multifrequency measurement technique is employed to determine the true distance between the substrates. Subsequent measurements can then be performed using the single frequency technique. A multifrequency measurement can be repeated periodically or more frequently, if the single frequency measurement technique indicates that the spacing between the substrates is rapidly changing. The multifrequency measurement technique of the present invention can be implemented using a multifrequency source in which multiple frequencies are simultaneously provided, or a multifrequency source that moves through a frequency over time. The frequency range can be a continuous range or it can be discreet steps. Any appropriate film material may be used including oil, air, other gas or liquid, etc. The present invention includes the use of reflectance spectroscopy to determine the variation of a spectrum (spectrum shift/moving) to measure the variation of a cavity that is related to variation of a pressure.

The invention claimed is:

1. An apparatus configured to sense pressure of a process fluid, comprising:
    a pressure sensor body comprising:
        a first layer;
        a second layer spaced apart from the first layer, wherein spacing between the first and second layers is related to an applied pressure;
    a light source directed at the pressure sensor body which provides a reflection;
    a light sensor arranged to sense the reflection and provide an output related to the applied pressure based upon the reflection;
    a non-volatile memory configured to store data related to a reflected light spectrum from the pressure sensor and a current condition of the pressure sensor; and
    a controller having an output related to pressure of the process fluid as a function of the sensed reflection and the stored data including I/O circuitry configured to provide an output on a process control loop related to the pressure of the process fluid.

2. The apparatus of claim 1 wherein the first and second layers comprise a brittle transparent material.

3. The apparatus of claim 1 wherein the first and second layers are formed by a deformable pressure sensitive body.

4. The apparatus of claim 1 including a housing which contains the pressure sensor body, the housing filled with an isolation fill fluid.

5. The apparatus of claim 1 wherein the light source includes an optical grating.

6. A method of detecting pressure of a process fluid comprising:
   applying a pressure to a deformable pressure sensitive body having first and second spaced apart layers and thereby causing a change in the spacing between the first and second layers;
   directing a light source at the first and second layers and generating reflections from the first layer and the second layer;
   sensing the reflections;
   comprising the sensed reflections with data stored in a non-volatile memory related to reflected light spectrum and a conductor of the pressure sensor body; and providing an output on a process control loop related to the applied pressure based upon the first and second reflection.

7. The method of claim 6 including passing the reflections through an optical grating prior to sensing the reflections.

8. An apparatus for measuring a pressure of a process fluid, comprising:
   a body that deforms in response to applied pressure;
   a light source directed at the body;
   a sensor configured to sense a light spectrum from the body;
   a memory configured to store spectrum data; and
   a controller configured to compare the sensed spectrum with the stored spectrum data and provide an output on a process control loop related to the applied pressure.

9. The apparatus of claim 8 wherein the sensor comprises a CCD sensor.

10. The apparatus of claim 8 wherein the sensor includes a grating.

* * * * *

UNITED STATES PATENT AND TRADEMARK OFFICE
CERTIFICATE OF CORRECTION

PATENT NO. : 7,409,867 B2 Page 1 of 1
APPLICATION NO. : 11/439097
DATED : August 12, 2008
INVENTOR(S) : Toy et al.

It is certified that error appears in the above-identified patent and that said Letters Patent is hereby corrected as shown below:

Title Page, item (75) "Andrian C. Toy" should be changed to --Adrian C. Toy--

Signed and Sealed this

Sixteenth Day of March, 2010

David J. Kappos
*Director of the United States Patent and Trademark Office*